United States Patent
Leiendecker (10) Patent No.: US 10,832,510 B2
(45) Date of Patent: Nov. 10, 2020

(54) SYSTEMS AND METHODS FOR BALLOT STYLE VALIDATION

(71) Applicant: TALLY LLC, St. Louis, MO (US)

(72) Inventor: Scott Leiendecker, St. Louis, MO (US)

(73) Assignee: Tally LLC, St. Louis, MO (US)

( * ) Notice: Subject to any disclaimer, the term of this patent is extended or adjusted under 35 U.S.C. 154(b) by 0 days.

(21) Appl. No.: 16/283,675

(22) Filed: Feb. 22, 2019

(65) Prior Publication Data

US 2019/0259235 A1 Aug. 22, 2019

Related U.S. Application Data

(60) Provisional application No. 62/634,005, filed on Feb. 22, 2018.

(51) Int. Cl.
*G07C 13/00* (2006.01)
*G06K 7/08* (2006.01)
*G06K 7/10* (2006.01)
*G06K 7/14* (2006.01)

(52) U.S. Cl.
CPC ........... *G07C 13/00* (2013.01); *G06K 7/084* (2013.01); *G06K 7/10297* (2013.01); *G06K 7/1413* (2013.01)

(58) Field of Classification Search
CPC ............... G07C 13/00; G06Q 2230/00; H04L 2209/463
USPC ............................. 235/386, 375, 487; 705/14
See application file for complete search history.

(56) References Cited

U.S. PATENT DOCUMENTS

| | | | |
|---|---|---|---|
| 6,641,033 B2 | 11/2003 | McClure et al. | |
| 6,973,581 B2 | 12/2005 | Chung | |
| 7,216,807 B2 | 5/2007 | McClure | |
| 7,240,835 B2 | 7/2007 | Brucker et al. | |
| 7,306,148 B1 | 12/2007 | Morganstein | |
| 7,406,480 B2 | 7/2008 | Seibel et al. | |
| 7,753,273 B2 | 7/2010 | Cummings | |
| 8,353,453 B2 | 1/2013 | Lee | |
| 8,714,450 B2 | 5/2014 | Arnao et al. | |
| 8,814,045 B1 | 8/2014 | Brockhouse | |
| 8,843,389 B2 | 9/2014 | Kaplan et al. | |
| 8,910,865 B2 | 12/2014 | Coomer et al. | |
| 9,384,518 B2 | 7/2016 | Chung | |
| 9,520,999 B2 | 12/2016 | Klevan | |
| 2002/0087394 A1 | 7/2002 | Zhang | |
| 2005/0218225 A1* | 10/2005 | Johnson | G06Q 50/26 235/386 |
| 2009/0032591 A1* | 2/2009 | Cordery | G07C 13/00 235/386 |
| 2012/0248185 A1* | 10/2012 | Contorer | G07C 13/00 235/386 |
| 2012/0278865 A1* | 11/2012 | Sawdy | G06Q 10/10 726/4 |
| 2014/0224872 A1* | 8/2014 | Griggs | G07C 13/00 235/380 |
| 2018/0211466 A1* | 7/2018 | Cheng Chuah | G07C 13/00 |

OTHER PUBLICATIONS

International Search Report and Written Opinion in corresponding Application No. PCT/US2019/019304, dated May 3, 2019, 8 pages.

* cited by examiner

*Primary Examiner* — Edwyn Labaze (57) ABSTRACT

Embodiments of a system and methods for ballot style validation are disclosed.

5 Claims, 14 Drawing Sheets

SYSTEMS AND METHODS FOR BALLOT STYLE VALIDATION

CROSS REFERENCE TO RELATED APPLICATIONS

This is a non-provisional application that claims benefit to U.S. provisional application Ser. No. 62/634,005 filed on Feb. 22, 2018, which is herein incorporated by reference in its entirety.

TECHNICAL FIELD

Aspects of the present disclosure relate to ballot style validation; and more particularly, to a system for ballot style validation where voter information may be accessed using an identification card (ID), and a ballot may be analyzed and/or validated to determine whether the ballot includes a ballot style associated with the voter information.

BACKGROUND

In elections, the distribution of a ballot to a voter where the ballot includes a ballot style that is not applicable to the voter, not unauthorized for the voter, or is otherwise incorrect, is a common issue. Ballots may look similar in nature and poll workers may be working with ballots for extended periods of time. As a result, it is typical for a poll worker to mistake one ballot style for another and little to no recourse exists after a voter leaves a polling location after having completed a ballot with an incorrect ballot style. Where a voter completes and submits a ballot with an incorrect ballot style for whatever reason, the voter's ballot may be disregarded by the recorder or government body in charge of collecting votes. As a result, use of the wrong ballot style by a voter can potentially alter final election results.

Conventional technologies for validating ballot styles may involve e.g. physically checking each ballot, or displaying a particular ballot style to a poll worker on a screen. These technologies and related methods are inefficient and may still lead to errors with ballot style selection.

It is with these observations in mind, among others, that various aspects of the present disclosure were conceived and developed.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure relate to systems and methods for ballot style validation which may be implemented to assist a poll worker to select a ballot with a predetermined ballot style for a voter. In particular, at least one computing device (which may be a client device) may be implemented for executing a validation module, and an electronic poll book to implement functionality described herein. A plurality of ballots may be generated or provided with a plurality of respective barcodes. Each of the barcodes may identify the ballot's identifier, party, and/or a unique sequential number for each ballot. A scanner, which may be implemented as a peripheral to the computing device, may be used to scan the barcode of each ballot to determine if the ballot style and party in the barcode are predetermined to be authorized for a particular voter.

In addition, voter information may be extracted from an identification card using a card reader peripheral of the computing device. The voter information may be used to assist a poll worker to identify a ballot style that pertains to or is predetermined to be valid for a particular voter. For example, the voter information may be used to generate a particular ballot identifier associated with a particular ballot style.

Unlike conventional ballot style verification/validation technologies, the system and methods of ballot style validation described herein allow a poll worker to be proactively notified when an incorrect ballot style is distributed to a voter. The present inventive concepts may be used by county election authorities across the country to ensure poll workers are providing the correct ballot style to voters thereby reducing the possibility of inaccurate election results. Referring to the drawings, embodiments of a system for ballot style validation are illustrated and generally indicated as 100 in FIGS. 1-8.

Figure 1:
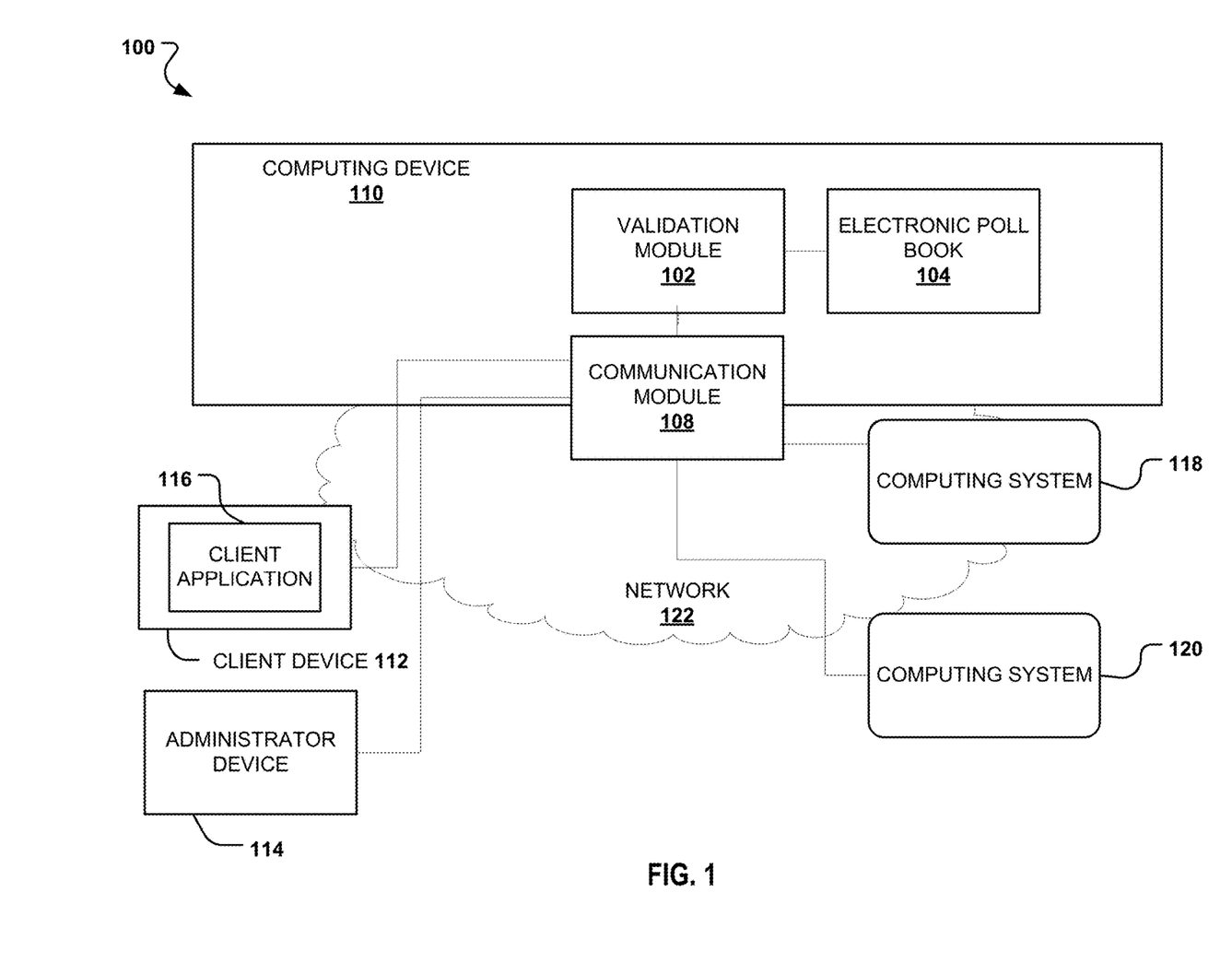
FIG. 1 is a diagram of a system for ballot style validation, according to aspects of the present disclosure.

Referring to FIG. 1, a system for ballot style validation ("system"), designated 100, is illustrated. In some embodiments, aspects of the system 100 may be implemented via a computing device 110. The computing device 110 may comprise at least one device and may comprise a server, rack, mainframe, terminal, or other such device operable to perform functionality as described herein. As shown, the computing device 110 may execute a validation module 102, and an electronic poll book 104 for managing ballot style validation and related functionality as described herein.

As further shown, the system 100 may service a client application 116, which may be accessible by a device 112 such as a laptop, tablet (e.g. IPad), desktop computer, smartphone, or any such mobile device. The client application 116 may include a browser-based application, software as a service (SaaS), or general application and defines a user-interface (UI) (demonstrated as screenshots in FIGS. 4A-4D) to interact with various end users. The UI of the client application 116 may be embodied as different interfaces depending upon where the client application 116 is being accessed and who is navigating the application (e.g. the voter, a poll worker, etc). The client application 116 incorporates aspects of the validation module 102 and the electronic poll book 104 for validating ballot style information as described herein. An administrator device 114 may be implemented to facilitate a technician or computer administrator to access, modify, and view aspects of the validation module 102 and the electronic poll book 104.

In some embodiments, the system 100 further includes a communication module 108 to facilitate communications across various components of the system 100 via a network 122. For example, the communication module 108 may be used to enable the computing device 110 to communicate with the client device 112 to e.g. push updates from the validation module 102 to the client application 116. The communication module may further enable communications between the computing device 110, the client device 116, a computing system 118, and a computing system 120. The computing system 118 and the computing system 120 may be associated with election officials, government agencies, or the like. The network 122 shown may include any network capable of transmitting communications from one device to another device such as, e.g., the Internet, a virtual private network, a local area network, a wide area network, a Wi-Fi network, a cellular network, or any combination thereof. Network 122 allows the various components of the system 100 to communicate with one another.

Figure 2:
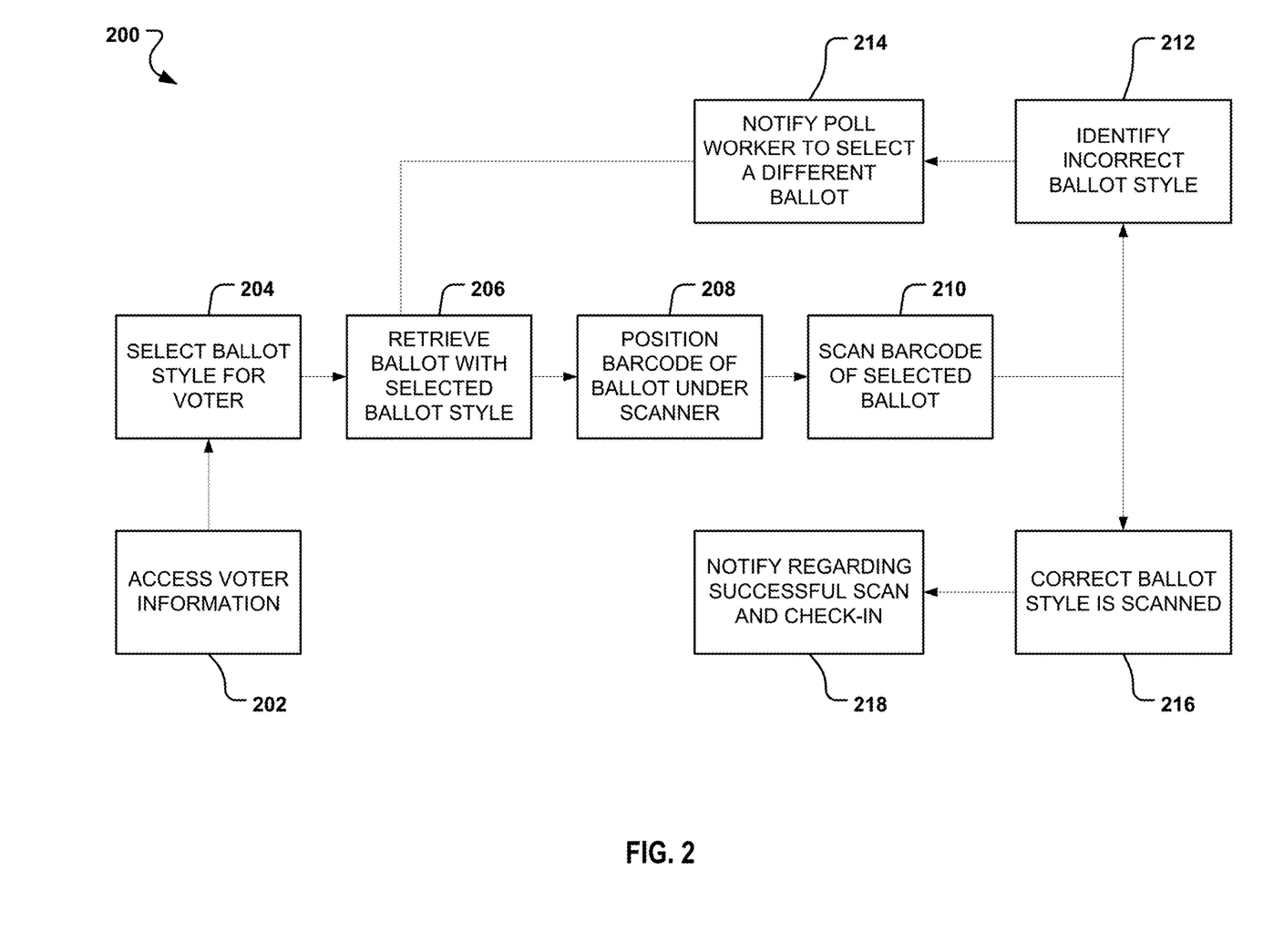
FIG. 2 is a process flow for implementing aspects of the system for ballot style validation, according to aspects of the present disclosure.

Referring to FIG. 2, a process flow 200 is illustrated which may be used to implement ballot style validation using the system 100. More particularly, the process flow 200 generally describes implementation of the system 100 to check-in a voter and retrieve a ballot for the voter; the ballot ideally having a predetermined known correct ballot style. Referring to block 202 and FIGS. 3A-3B, information about a voter may be generated or otherwise accessed. In some embodiments, to access information about a voter, a card reader 304 of the client device 112 may be utilized which may include a magnetic stripe card reader. The card reader 304 may be electronically coupled to the client device 112 as a peripheral as shown, or may be formed integral with the device 112. In some embodiments, the card reader 304 comprises a magnetic stripe reader or magstripe reader that reads information encoded in a magnetic stripe. This information may be accessed by the client application 116 through a serial port of the device 112, a USB connection, or keyboard wedge, and the like.

Figure 3A:
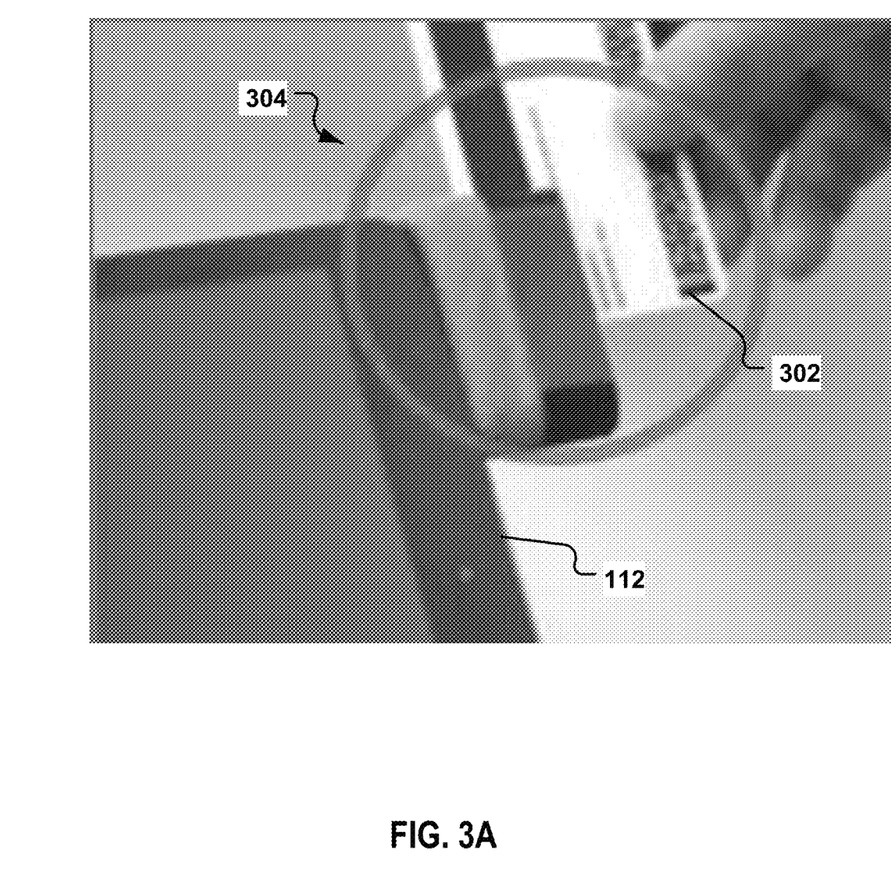
FIGS. 3A-3C are photographs of an identification card, card reader, and ballot scanner or scanning peripheral for accessing information about a voter which may be used to identify a predetermined ballot style associated with the voter, and validating the ballot style using the ballot scanner, according to aspects of the present disclosure.
Figure 3B:
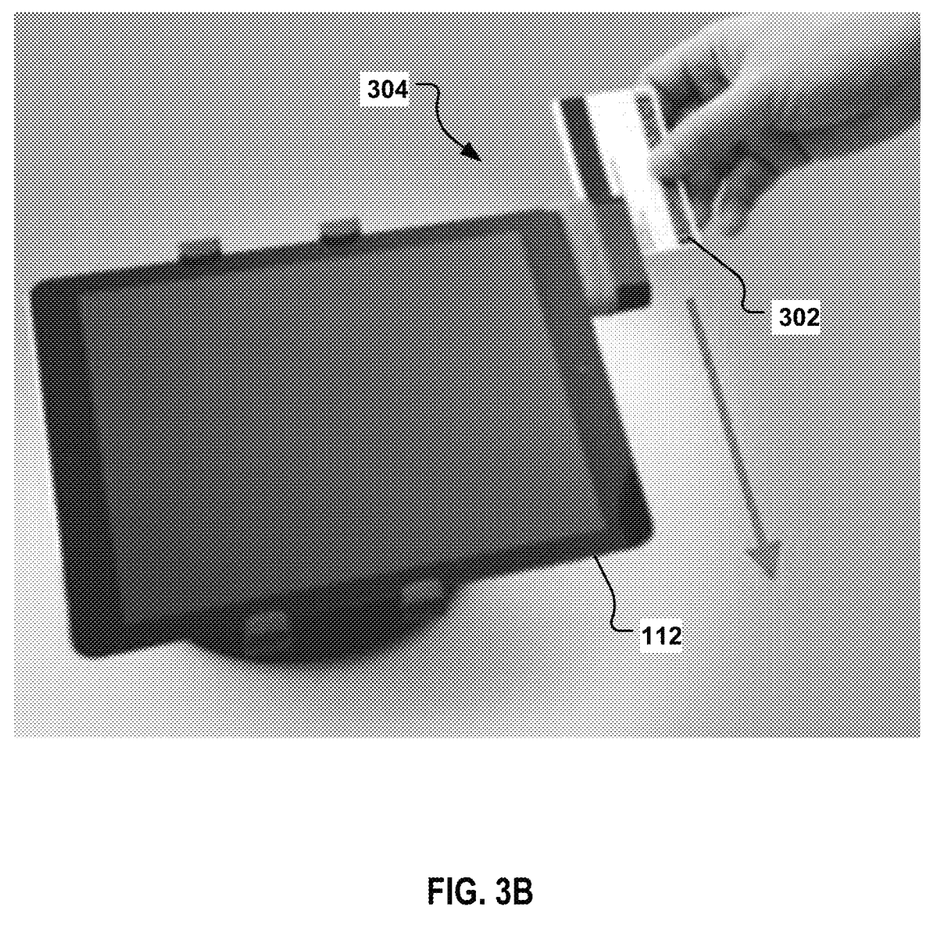

The card reader 304 may be implemented to access information from an identification card 302 of the voter, such as a driver's license, voting card, or the like. Specifically, as indicated in FIG. 3B, a poll worker or other user may swipe a magnetic stripe of the identification card 302 against, or through the card reader 304 to access information about a voter, which may define voter information. Voter information may include the voter's age, name, political party, address, voting precinct, and the like. In other embodiments, a bar code, or a chip of an identification card may be scanned by the client device 112 to access information about a voter similar to the card reader 304.

Referring to block 204 of FIG. 2, once the voter information has been accessed from the identification card 302, a ballot style may be selected by a poll worker. The ballot style should, in most cases, be specific to a user's voting precinct and/or political party as identified from the voter information accessed from the identification card 302. In other words, a ballot style is generally predetermined or otherwise assigned to a voter based upon aspects of the voter information. In some embodiments, the client application 116 of the client device 112 may be implemented to process the voter information using one or more rules or functions, and generate a known correct ballot style for a particular voter based upon the voter information.

Referring to block 206, the poll worker may then retrieve a ballot 310 for the voter, using any ballot style information gleaned from the voter information. As described herein, the ballot 310 may include a barcode 312 which contains information about the ballot such as a ballot identifier, party, and/or a unique sequential number.

Figure 3C:
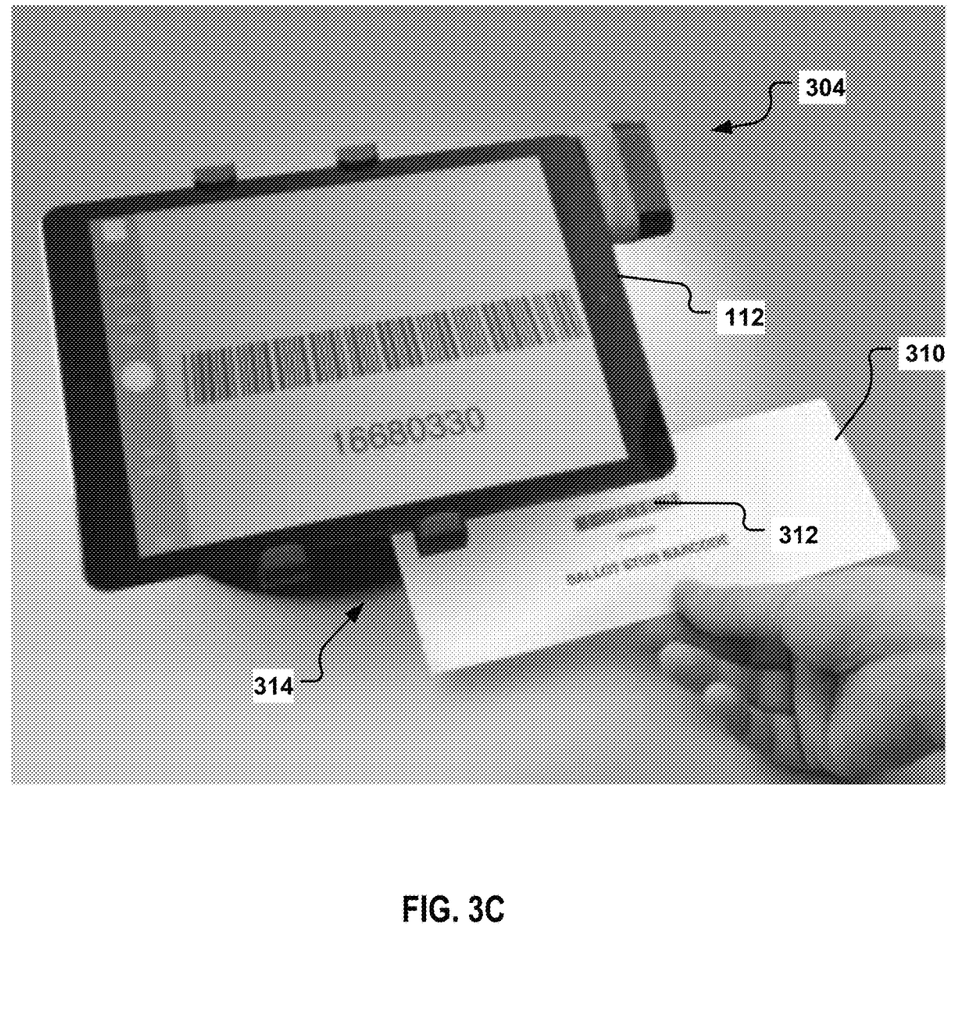
Figure 4A:
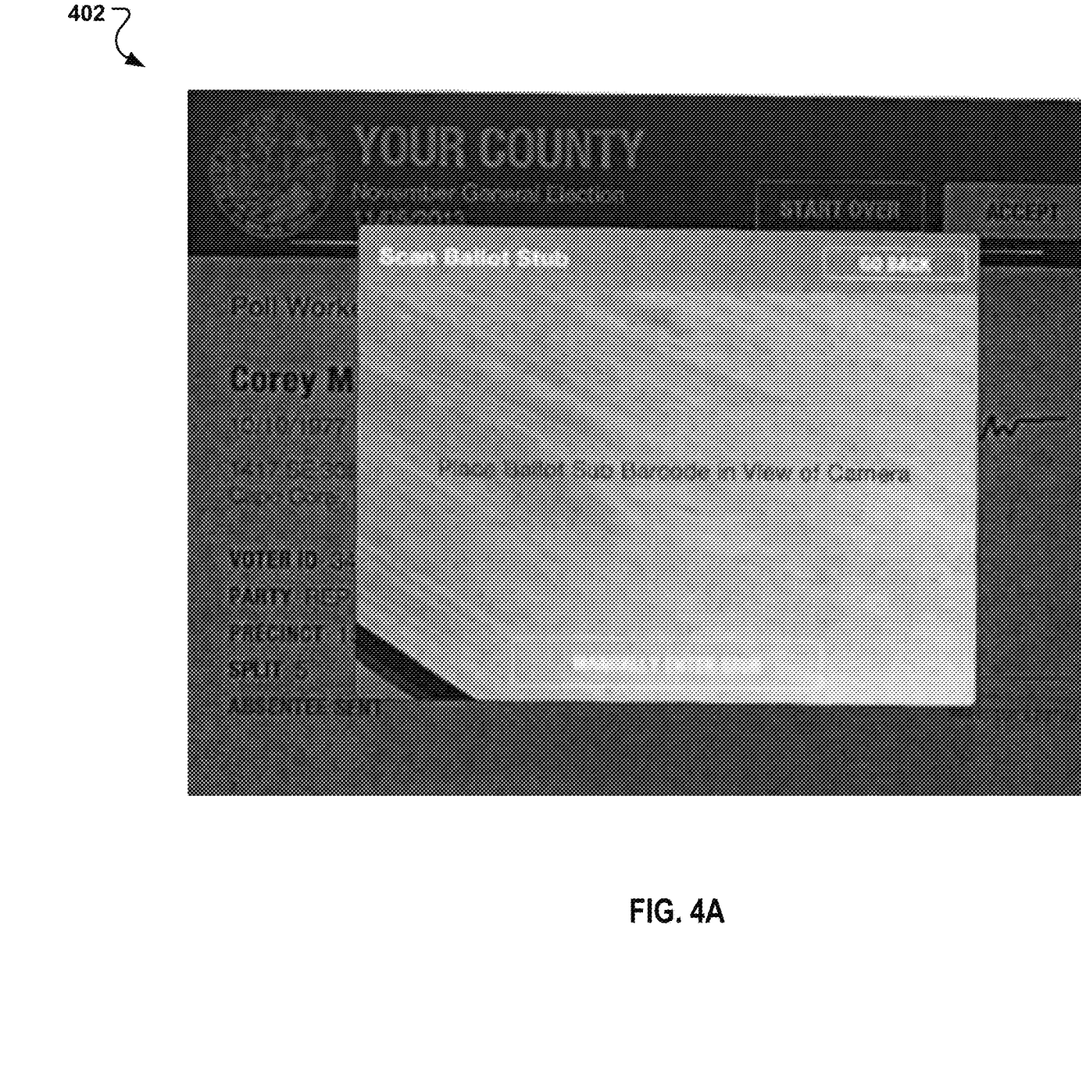
FIGS. 4A-4D illustrate various screenshots associated with validation as to whether a ballot with a predetermined ballot style is selected for a voter, according to aspects of the present disclosure.
Figure 4B:
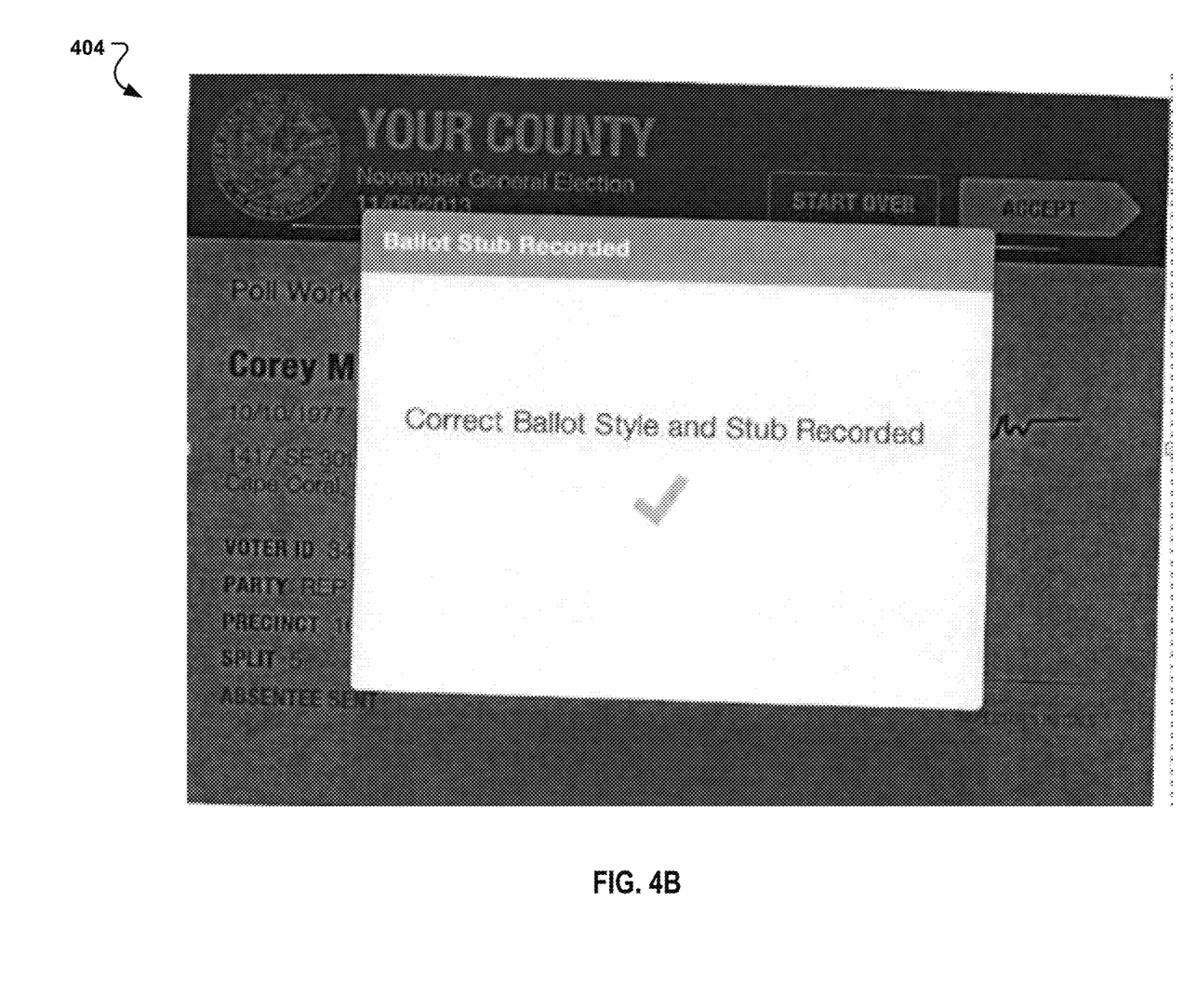
Figure 4C:
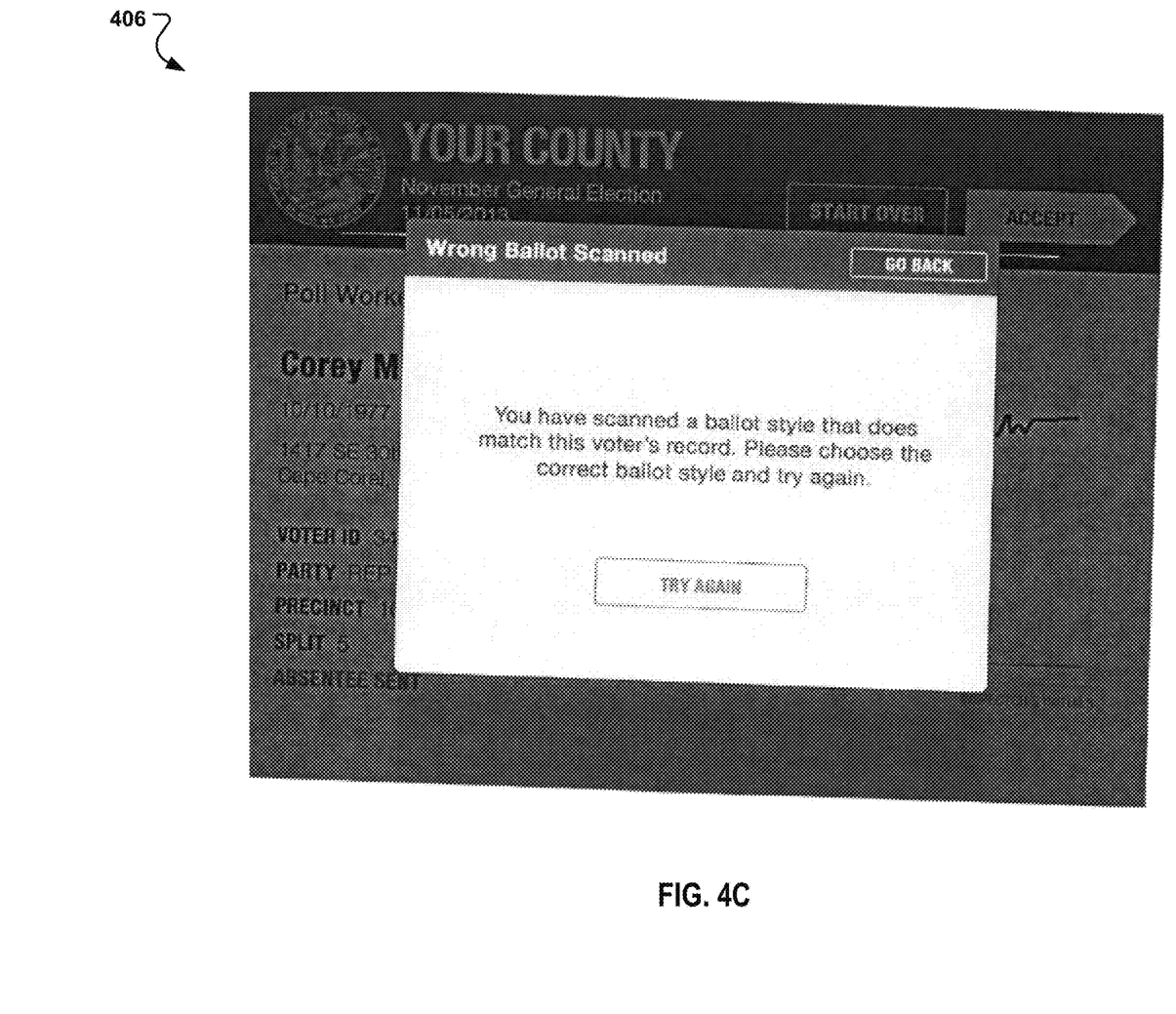
Figure 4D:
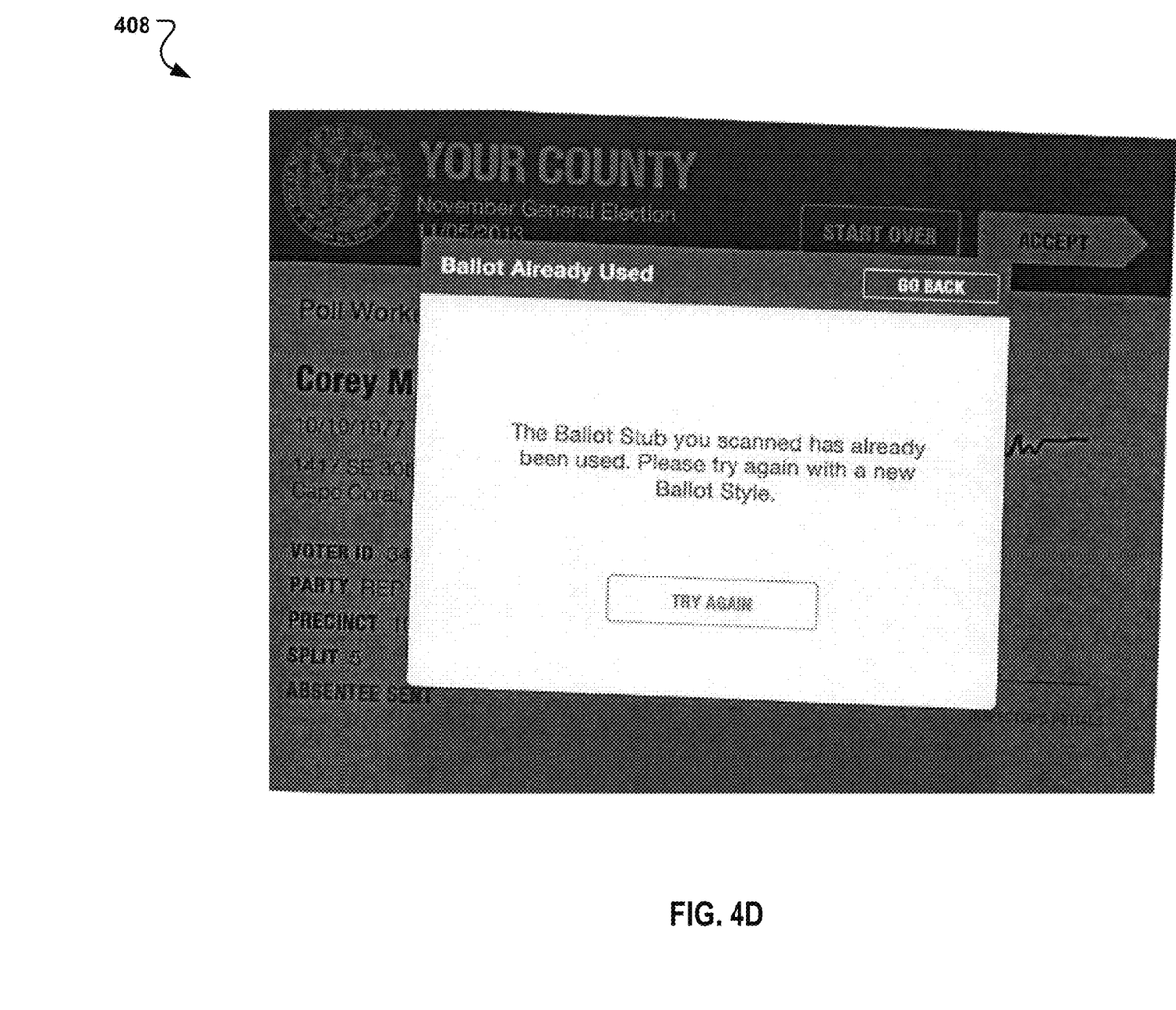

As illustrated in block 208, block 210, and FIG. 3C, the poll worker may then validate whether he/she has selected the correct ballot 310 (with a predetermined ballot style) for the voter by processing the ballot 310 using a scanning peripheral 314 electronically coupled to the client device 112. The scanning peripheral 314 may include a dedicated barcode scanner, a camera (such as an IPad camera), or any other such optical device capable of interpreting the barcode 312. In some embodiments, the ballot 310 with the barcode 312 may be oriented towards the scanning peripheral 314, which may be an IPad camera. The scanning peripheral 314 may then be activated to scan the barcode 312 of the ballot 310. In the case of an IPad camera, the scanning peripheral 314 may scan the barcode 312 by merely capturing a picture or image of the barcode 312, and processing the image to extract information about the ballot 310 such as a ballot stub number, ballot style, or the like. Referring to FIG. 4A, the client application 116 may display notifications to the poll worker to place the barcode 312 of the ballot 310 in view of the scanning peripheral 314 in a particular centered position as shown. The notifications may be in the form of a pop-up box although the present disclosure is not limited in this regard.

In some embodiments, as shown in FIG. 4A, the image in the middle of the display generally defines a scan area of the scanning peripheral 314. In other words, in the case of an IPad camera as the scanning peripheral 314, the barcode 312 may be aligned over the camera and substantially centered as shown. The poll worker may also manually enter stub information of the ballot 310, as indicated.

In some embodiments, when a barcode is scanned, the following parameters and information may be generated or otherwise accessed:

General Election: [BALLOTSTYLE]-[BALLOTSTUBNUMBER]

Primary Election: [BALLOTSTYLE]-[PARTY]-[BALLOTSTUBNUMBER]

The double hyphen character of the above information accessed from the barcode 312 may define a separator. The above parameters may be compared to the voter information extracted or otherwise accessed using the card reader 304.

In some embodiments, referring to FIG. 3C, the card reader 304 may be oriented along a first side of the client device 112, and the scanning peripheral 314 may be oriented along a second side of the client device 112 adjacent the first side as shown, which may facilitate a more natural flow for scanning and voter processing. In other embodiments, the card reader 304 and/or the scanning peripheral 314 may merely be in communication with the client device 112 and may not necessarily be physically coupled to the client device 112 and additional variations are contemplated.

Referring to block 212, in some cases the poll worker may have retrieved a ballot 310 for the voter that has an incorrect or inapplicable ballot style, for whatever reason. As shown in block 214, the poll worker may be notified that the poll worker has selected the wrong ballot style, and the poll worker can be prompted to retrieve another ballot having the correct ballot style for the voter. For example, referring to FIG. 4C, where the voter information does not match with the ballot style of the ballot 310 scanned, a message may be displayed via the client application 116 that indicates that the ballot style of the ballot 310 does not match the voter's records or voter information. The poll worker may further be prompted to try a different ballot 310 with a different barcode 312 and different ballot style.

In some embodiments, in addition to checking if the ballot style is correct for a voter, a stub number associated with the ballot 310 may also be checked to determine whether the specific ballot 310 has already been used by another voter. When scanning the ballot barcode 312 or serial number, reference may be made to a database tracking use of the ballots to determine whether the same serial number or barcode has already been used for the same ballot style in the current polling location.

In some embodiments, the database may be scanned for all voters checked in at the current location (including those synced via multipeer and server) to check if that serial number has already been used for the same ballot style. For example, if serial number "0001" is scanned for the ballot style CLEVE001 at the current location, it may be checked to see if that ballot serial number has already been issued for that ballot style and location. If so, the notification illustrated in FIG. 4D may be presented via the client application 116 and a display of the client device 112.

Referring to block 216 of FIG. 2, in some cases, the poll worker may scan the ballot 310 using the scanning peripheral 314 of the client device 112 by and the client application 116 may indicate that the correct ballot style has been scanned and selected for the voter. Subsequently, as indicated in block 218 and FIG. 4B, the client application 116 may display a prompt or message regarding successful check-in and distribution of the ballot 310 (with a correct ballot style) to the voter. In some embodiments, this defines validation of the ballot style of the ballot 310 given to the voter from the poll worker.

Figure 5:
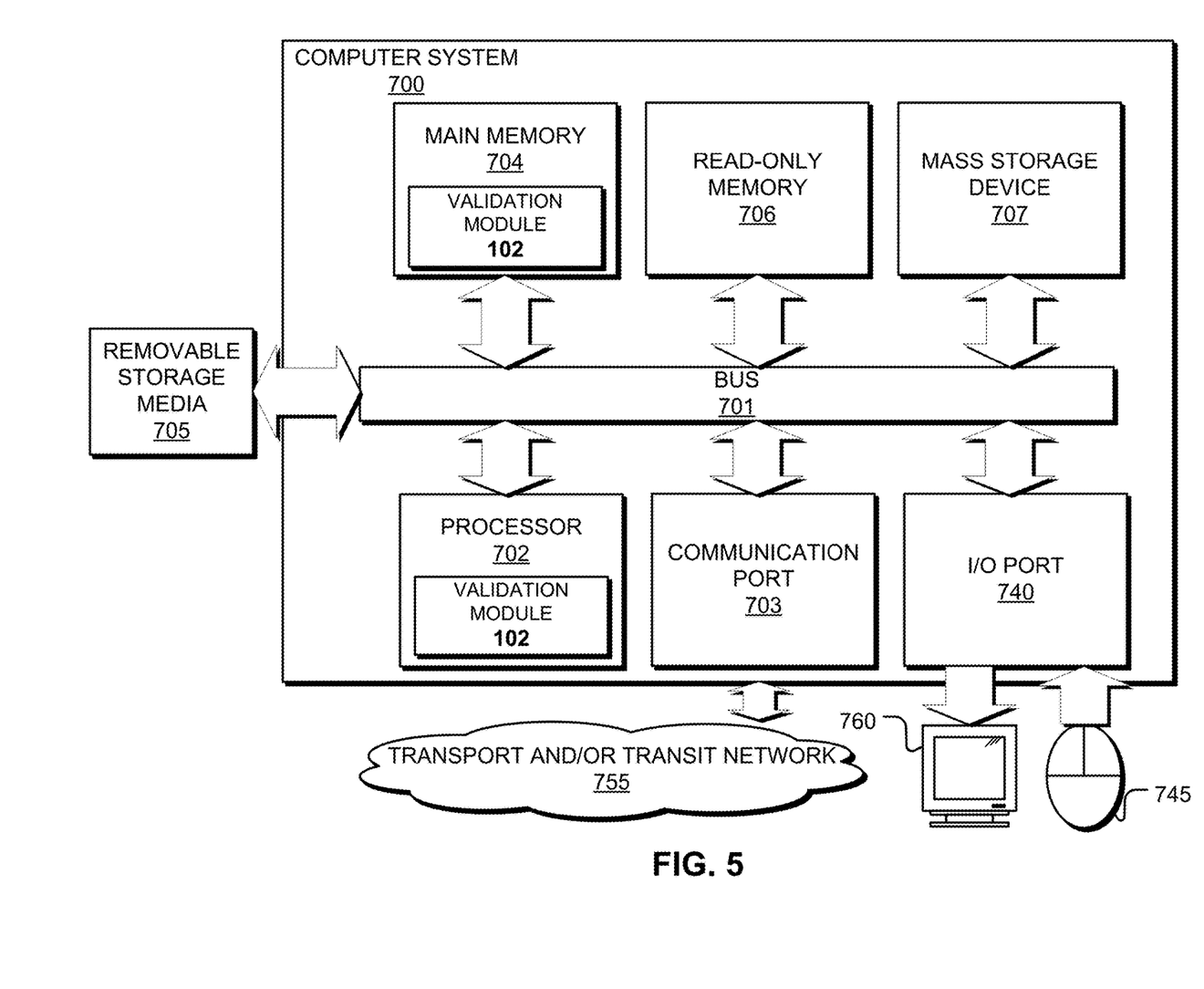
FIG. 5 illustrates an example of a computing system that may implement various services, systems, and methods discussed herein, according to aspects of the present disclosure.

FIG. 5 is an example schematic diagram of a computing system 700 that may implement various methodologies discussed herein. For example, the computing system 700 may comprise a server used to execute aspects of the system 100. The computing system 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer system 700 connects. Computing system may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 may be encoded with aspects of the system 100 such as the validation module 102 that supports functionality discussed above. In other words, aspects of the validation module 102 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret or otherwise perform processes, such as through logic instructions, executing on the processor 702 and based on the validation module 102 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments are described herein as including one or more modules, e.g. validation module 102. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

Figure 6:
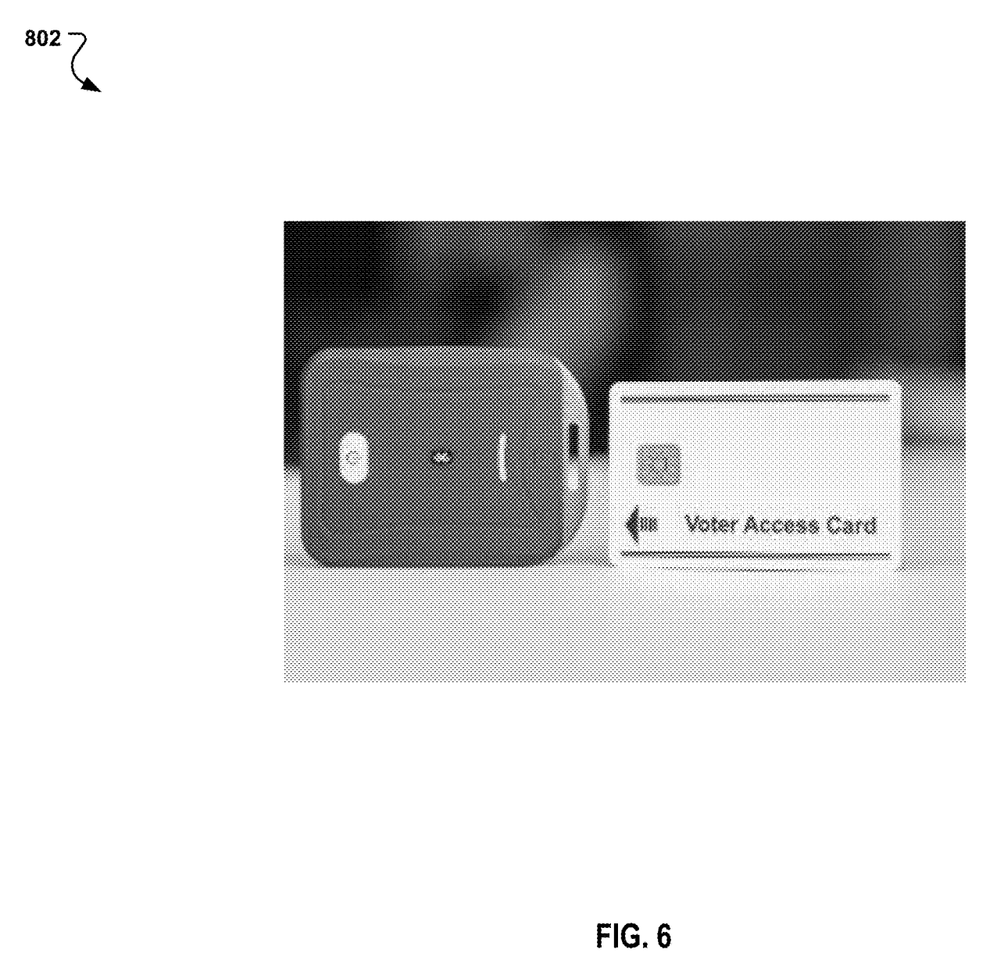
FIG. 6 illustrates a photograph of an encoding device, according to aspects of the present disclosure.

Referring to FIG. 6, in some embodiments, the device 112 may include an encoder 802 that is configured to interpret encoded information on RFID chip cards and encode any number of chip cards. Using the encoder 802, chip cards containing, e.g., voter data, can be reconfigured to add voter information, and/or erase or edit such information. The encoder 802 is in operative communication with the device 112, may be integrally formed with the device 112, and/or may be detachable from the device 112.

Figure 7A:
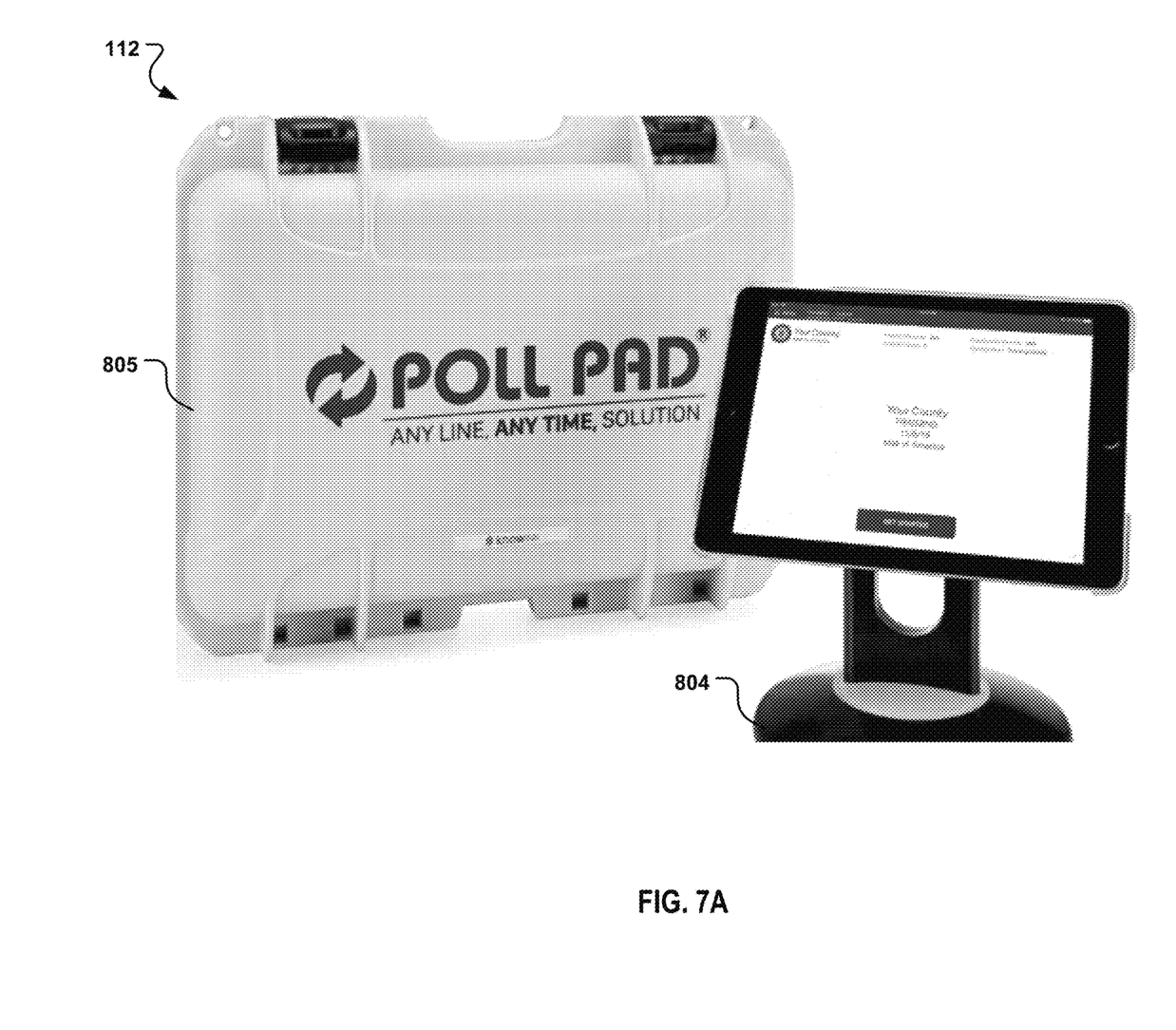
FIGS. 7A-7B are photographs of a battery base, according to aspects of the present disclosure.
Figure 7B:
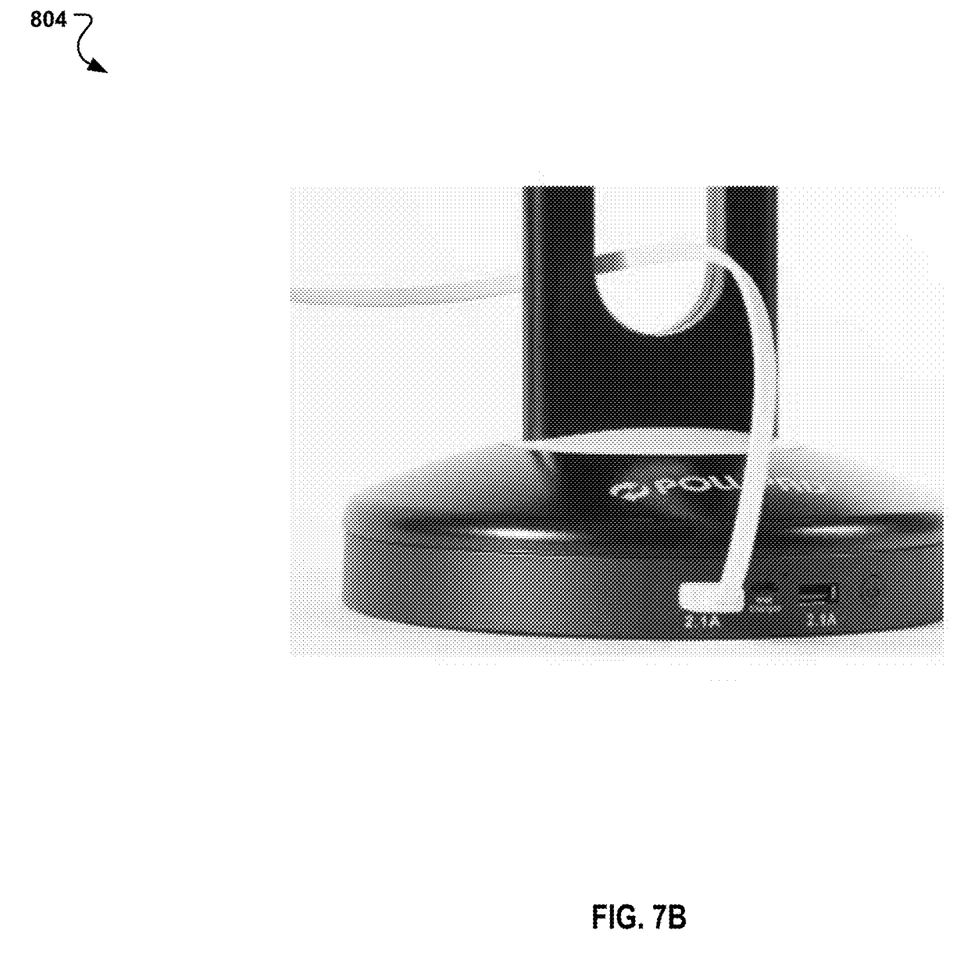

Referring to FIGS. 7A-7B, in some embodiments, the device 112 may include a battery base 804 and a case 805. The battery base 804 may generally include a power supply in the form of an extended battery that may provide anywhere from 10-20 hours of use, and may include a power cable for connection to a general electrical outlet or other power source. As indicated, the battery base 804 provides dual functionality; i.e., the battery base 804 provides a power source and a physical base for stabilizing the device 112 along a surface, such as a table of a polling center. The case 805 may be configured to house and protect the device 112.

Figure 8:
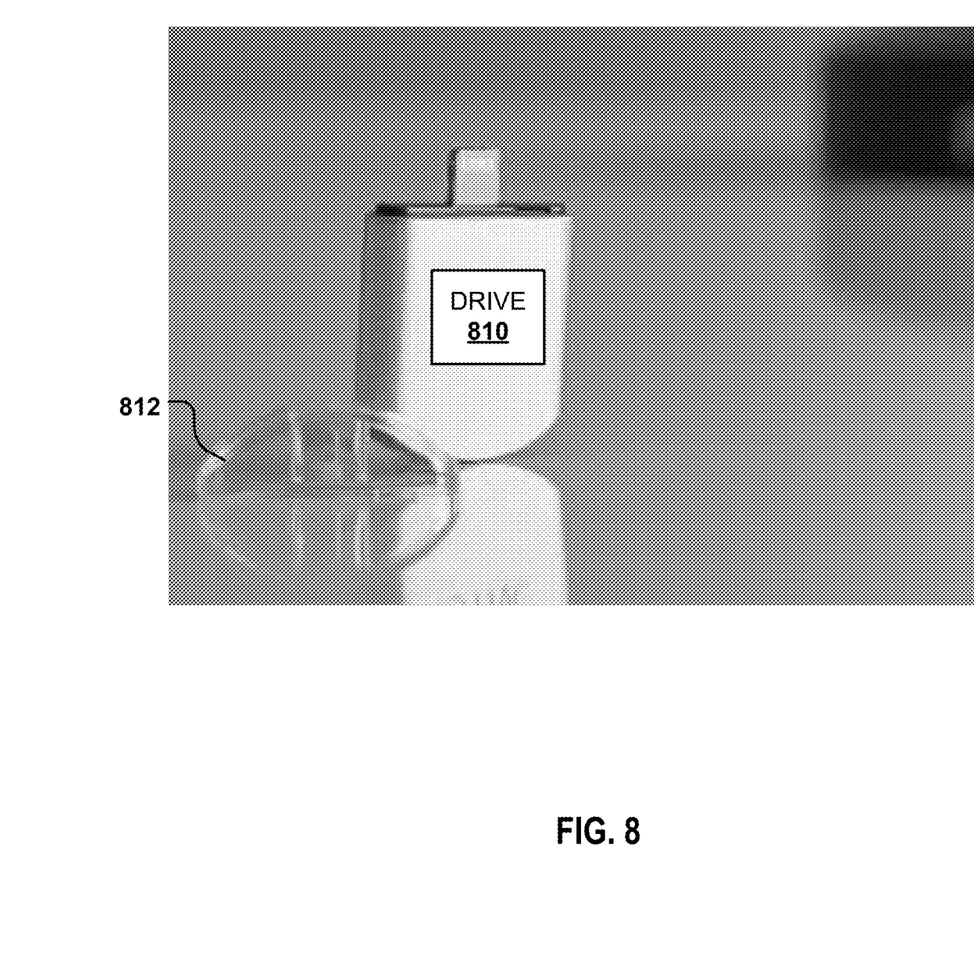
FIG. 8 is a photograph of a flash drive, according to aspects of the present disclosure.

Referring to FIG. 8, in some embodiments, the device 112 may include a flash drive or drive 810. The drive 810 may be electrically and detachably coupled to the device 112 and may be used to, e.g., upload voter data to the device 112. The drive 810 may include a Lightning Connector by Apple® that enables operative connection of the drive 810 to the device 112, a PC, a Mac computing device, and the like, so that voter/elections information can be flexibly and efficiently transported as desired. The device 810 may be configured with encryption software features that accommodate the creation and management of password-protected files, for enhanced security.

In addition, the device 810 may be configured with 8 Gb or more of storage capacity, and may include a cover 812 as shown. In some embodiments (not shown), the device 810 may include a USB, micro USB, or mini-USM connector to accommodate connectivity to other different devices.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method, comprising: accessing voter information associated with a voter, by accessing a magnetic stripe of an identification card of the voter using a card reader; identifying a ballot style from the voter information; selecting a ballot, the ballot having a ballot style associated with the voter information; and validating whether the ballot as selected defines a predetermined known correct ballot style for the voter information prior to providing the ballot to the voter, comprising processing a barcode of the ballot through a barcode scanner, extracting ballot style parameters from the barcode of the ballot as processed, and comparing data of the ballot style parameters with the ballot style associated with the voter information.

2. The method of claim 1, further comprising:
accessing the voter information from an RFID chip of a voter card using an encoder.

3. A system, comprising: a device, including: a touch-pad display, a scanner in operative communication with the touch-pad display and configured for accessing elections information from a barcode, a card reader in operative communication with the touch-pad display and configured for accessing information from a magnetic stripe of a voter card; and a processor associated with the device, configured to: access voter information from a card read by the card reader, identify a ballot style from the voter information, select a ballot, the ballot having a ballot style associated with the voter information, access ballot style parameters from a barcode of the ballot as processed by the scanner, and validate whether the ballot style parameters correspond to a predetermined known correct ballot style for the voter information prior to providing the ballot to a voter.

4. The system of claim 3, wherein the device includes a tablet.

5. The system of claim 3, further comprising an encoder in operative communication with the touch-pad display for accessing voter information from RFID chips.

* * * * *